Oct. 25, 1927.
S. W. AVIS
1,646,571
FEEDING DEVICE
Filed March 22, 1924
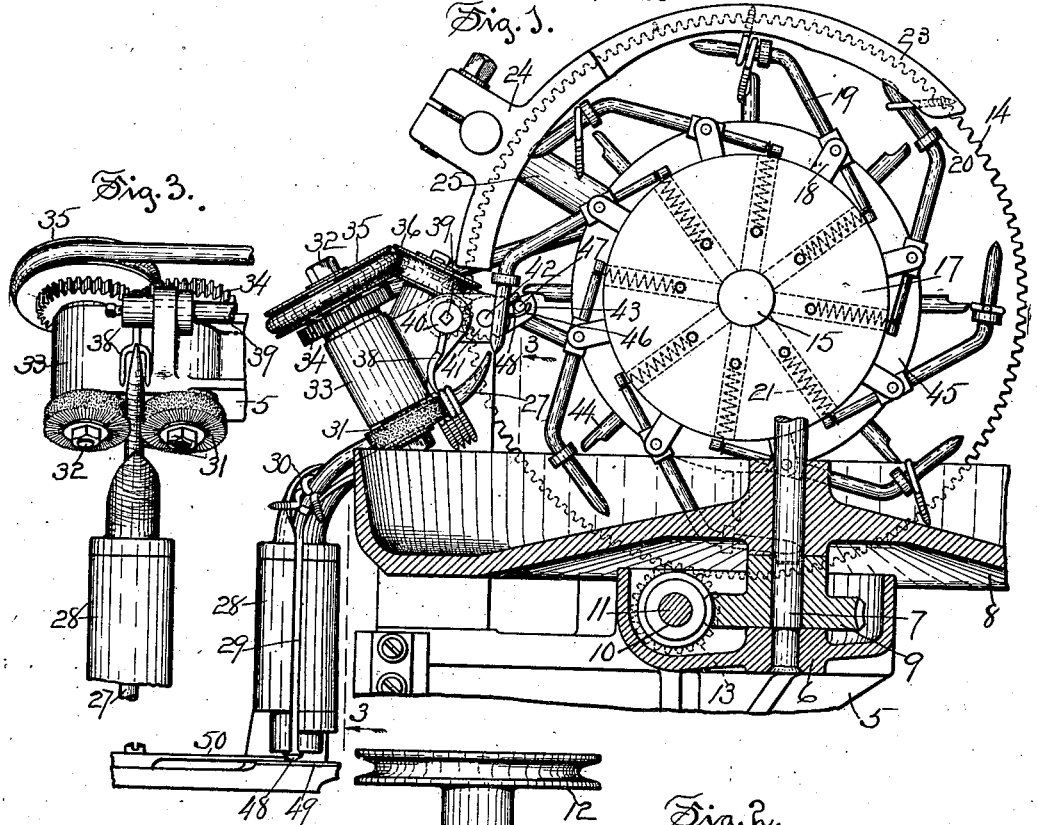
Fig. 1.
Fig. 3.
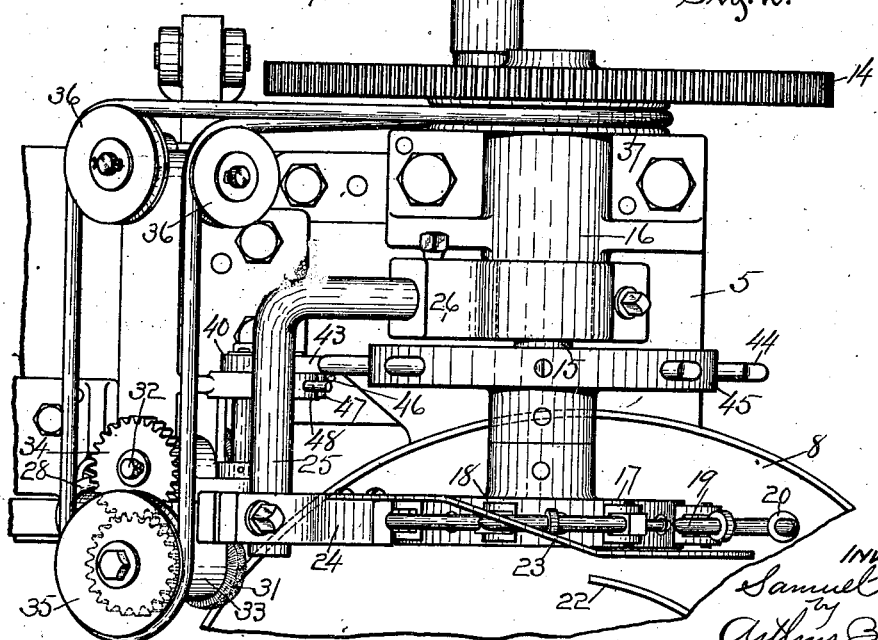
Fig. 2.
INVENTOR
Samuel W. Avis
by
Arthur B. Jenkins
ATTORNEY Patented Oct. 25, 1927.

1,646,571

UNITED STATES PATENT OFFICE.

SAMUEL W. AVIS, OF WEST HARTFORD, CONNECTICUT, ASSIGNOR TO THE FULLER BRUSH COMPANY, OF HARTFORD, CONNECTICUT, A CORPORATION OF CONNECTICUT.

FEEDING DEVICE.

Application filed March 22, 1924. Serial No. 701,236.

My invention relates to the class of devices usually comprising a part of a machine for operating upon articles, it being employed to deliver articles to the machine for operation thereon, and an object of the invention, among others, is to provide a device of this class that shall be particularly efficient and rapid in its mode of operation.

One form of device embodying my invention and in the construction and use of which the objects herein set out, as well as others, may be attained, is illustrated in the accompanying drawings, in which—

Figure 1 is a view in central vertical section through the hopper comprising a portion of the device and showing the operative parts connected therewith.

Figure 2 is a top view of the feeding device with the hopper partially broken away.

Figure 3 is a view in section on a plane denoted by the dotted line 3—3 of Figure 1, and with certain portions of the machine omitted.

My invention illustrated and described herein is particularly adapted for supplying metallic articles, as screw-eyes, to a machine for affixing such articles to handles or the like, in the accompanying drawings the numeral 5 denoting a bracket that is secured to the frame of the machine of which this feeding device forms a part, said bracket having a bearing 6 in which a stud shaft 7 is secured and upon which a hopper 8 is rotatably mounted. A worm wheel 9 is secured to the hopper as by means of interengaging notches and lugs, as shown in dotted lines in Figure 1, and this worm wheel is driven as by means of a worm 10 secured to a driving shaft 11 mounted in the bracket 5 and having on its end opposite the worm 10 a sheave 12 adapted to receive a belt extending from driving mechanism located on the machine of which the feeding device is a part.

A pinion 13 (shown in dotted lines in Figure 1) meshes with a gear 14 secured to a feed shaft 15 mounted in a bearing 16 rising from and constituting a part of the bracket 5, said shaft 15 extending to a position overlying the hopper 8 and having a feed wheel 17 secured to that end overlying the hopper. This feed wheel is provided with feed finger supports 18 projecting radially from the periphery thereof and having feed fingers or receivers 19 pivotally mounted thereon, said feed fingers having their outer and operative ends located preferably at an angle to the parts mounted in said support, and said fingers having shoulders 20 to prevent an undue accumulation of screw-eyes upon the fingers. The ends of the feed fingers opposite the active end have springs 21 secured to them and projecting into recesses in the feed wheel 17, in which recesses the springs are secured. These springs serve to permit a yielding movement to the feed fingers to enable them to effectively perform their functions without injury by reason of an undue accumulation of screw-eyes upon them when picking up screw eyes from the hopper 8. A collector 22 in the form of a spirally extending plate may be located in the bottom of the hopper 8 for the purpose of collecting the screw-eyes at certain predetermined portions of the hopper in order that they may be effectively engaged by the fingers to be picked up thereby.

An adjuster 23, in the form of a plate, is secured to an adjuster support 24 mounted on the end of an adjuster supporting arm 25 extending from a clamp bracket 26 secured to a projection from the bearing 16. The function of the adjuster is to cause the screw-eyes to assume a depending position from the fingers in case they do not automatically do this. If the screw-eyes, when picked out of the hopper by the fingers, project outwardly away from the axis of the feed wheel 17, and as shown in Figure 1, said screw-eyes will engage the side of the adjuster and when they encounter the inclined portion of the adjuster shown in Figure 2 they will be forced over to one side to such degree that they will fall to a depending position and will thus be properly arranged for reception upon the end of a guide rod 27 supported in operative position with respect to the path of movement of the fingers caused by the rotation of the wheel 17.

The guide rod 27 extends downwardly through an aligner 28 having an aligning slot 29, said rod being secured to the main part of the machine upon which this feed mechanism is mounted, such point of attachment of the rod not being shown herein. The slot 29 has a widened mouth 30 within which the screw-eyes are received as they travel downwardly along the rod 27.

To aid in this movement of the screw-eyes along the rod 27, accelerators, in the form of brushes 31, are located upon opposite sides of the rod, these accelerator brushes being secured to the end of shafts 32 mounted in a diagonal position in bearings 33 in the bracket 5, said shafts having intermeshing pinions 34 by means of which they are driven in opposite directions and one of said shafts having a driving sheave 35 around which a belt extends, said belt passing around idlers 36 mounted in bearings diagonally arranged on the bracket 5 to a sheave 37 secured to the feed shaft 15, and as shown in Figure 2 of the drawings.

A forked kicker 38 is secured to a kicker shaft 39 mounted in an upward extension of the bracket 5 and having a gear segment 40 meshing with a gear segment 41 pivotally mounted upon a pin 42 and having an actuating finger 43 projecting into the path of movement of sweeps 44 projecting from the edge of a disc 45 secured to the shaft 15. The finger 43 is held in its normal position of rest as by means of a spring 46 pressing against a pin 47 projecting from the side of the finger and forcing said pin into contact with a stop 48.

The operation of the device will be readily understood, it being noted that as the feed fingers 19 or receivers are moved through a mass of screw-eyes located in the hopper 8 more or less of said screw-eyes will be picked up by the fingers and will rest against the shoulders 20 thereon. As the screw-eyes are carried outwardly should they chance to project upwardly they will come in contact with the adjuster 23 by means of which they will be swung on the finger and by the action of gravity to a vertical position. As the fingers approach the end of the guide rod 27 the screw eyes will fall on to said guide rod as shown in Figure 1 of the drawings and the rotation of the accelerator brushes 31 will pass the screw eyes along the rod into the mouth 30 of the aligner 28 by means of which said screw eyes will be adjusted with their shanks all in alignment ready for delivery to devices for receiving them. Should an excessive number of screw eyes be accumulated upon the guide rod 27 the kicker 38 will remove the surplus, and thus keep the end of the rod so that it will not interfere with the movements of the tips of the spring fingers past the point of the guide rod. The hopper is arranged to supply screw eyes faster than the rest of the mechanism can use them, this in order to insure constant supply, and the kicker, therefore, acts as a regulator to control the supply and thereby prevent an over accumulation upon the guide rod.

The bottom of the hopper 8 slopes downwardly from the center toward the periphery thereof for the purpose of collecting a mass of articles within a certain portion of the hopper, and the collector 22 is spirally formed to assist in this operation. The screw eyes are thus collected in a mass and this result is further aided by the rotating movement of the hopper. An accumulated mass of screw eyes is thus located in the path of movement of the fingers 19 to insure at all times the effective picking up of the screw eyes by said fingers. The hopper is preferably rotated in a direction to cause the screw eyes to travel toward the feed fingers 19.

The guide rod 27 extends through the aligner 28 and is constructed to yieldingly retain the screw eyes in place at its lower end, the aligner in fact constituting a magazine to receive the screw eyes supplied to it by the fingers 19. The rod is loosely mounted in the aligner, or magazine, and when the screw eyes are located upon it, it is spaced from the inner wall of the magazine. It is loosely mounted for vertical movement in the magazine and its lower end is beveled as at 51 and rests upon a receiving plate 49. This enables the eyes to be forced from engagement with the rod by any proper device, as a pusher 50 operated in any desired manner.

In accordance with the provisions of the patent statutes I have described the principles of operation of my invention, together with the apparatus which I now consider to represent the best embodiment thereof; but I desire to have it understood that the device shown is only illustrative, and that the invention may be carried out by other means and applied to uses other than those above set out.

I claim—

1. A feed mechanism including a receptacle to receive articles having holes therein, a collecting member, means for passing said member endwise through a mass of articles in the receptacle to collect said articles thereon, and a receiving member having its end positioned in such manner as to permit said article to be received thereon by its hole and conducted thereby from the collector.

2. A feed mechanism including a receptacle to receive articles, a collector, means to pass the collector through a mass of articles in the receiver to collect the articles thereon and then invert the collector to permit the articles to drop therefrom, and a receiving prong having its end positioned in such manner as to permit said article to be received thereon by its hole and conducted thereby from the collector.

3. A feed mechanism including a receptacle to receive articles, a collector, means to pass the collector through a mass of articles in the receiver to collect articles thereon, and a receiving member arranged and positioned substantially in such manner as to permit said article to be received thereon by its hole and conducted thereby from the collector.

4. A feed mechanism including a receptacle to receive articles, a collector, means for carrying said collector in a concentric path having a horizontal axis and extending into the receptacle, and a receiver having its end positioned in such manner as to permit said article to be received thereon by its hole and conducted thereby from the collector.

5. A feed mechanism including a receptacle, a collector comprising a main part and an article receiving end, the latter extending substantially in the path of travel of said collector, means for moving said collector in said path that extends into the receptacle, and a receiver having its end positioned in such a manner as to permit the article to be received thereon by its hole and conducted thereby from the collector.

6. A feed mechanism including a receptacle, a collector comprising a main part and an article receiving end extending at an angle to the main part and also extending substantially in the direction of the path of travel of said collector, means for moving said collector in said path that extends into the receptacle, and a receiver having its end positioned in such a manner as to permit the article to be received thereon by its hole and conducted thereby from the collector.

7. A feed mechanism including a receptacle, a collector yieldingly pivotally mounted and having a receiving end extending substantially in the direction of the path of travel of the collector, means to permit said collector to yield from undue force applied by articles in the receptacle, means for moving said collector in said path that extends into the receptacle, and means for receiving articles from the collector.

8. A feed mechanism including a receptacle, a collector including a main part yieldingly pivotally mounted and a collecting end extending substantially in the direction of the path of travel of said collector, means to permit said collector to yield from undue force applied by articles in the receptacle, means for moving said collector in a concentric path having a horizontal axis, and means for receiving articles from the collector.

9. A feed mechanism including a receptacle to receive articles with holes therein, a collector movable into said receptacle to pass into the holes in said articles and thereby pick them up, and a receiver having its receiving end located substantially in extension of said collector in a certain position of the latter and to be received in the openings of said articles as they pass from the collector.

10. A feed mechanism including a receptacle, a collector continuously movable into said receptacle to pick up articles therefrom, an adjuster located in the path of disarranged articles on the collector to properly arrange them, and means for receiving articles from said collector.

11. A feed mechanism including a receptacle, a collector continuously movable into said receptacle to pick up articles therefrom, an adjuster extending at an angle across the path of movement of disarranged articles on the collector to properly arrange them, and means to receive articles from said collector.

12. A feed mechanism including a receptacle, a collector movable into said receptacle to pick up articles therefrom, a receiver for articles delivered by said collector, and means located upon opposite sides of the receiver to engage said articles and force them along the receiver.

13. A feed mechanism including a receptacle, means for collecting articles from the receptacle, a receiver for articles delivered by said means, and rotatably mounted brushes located upon opposite sides of the receiver to engage said articles and force them along the receiver.

14. A feed mechanism including a receiver, means for delivering articles to the receiver in a train, and a hollow aligner having a widened mouth in its side in which the articles are received, said mouth narrowing into an aligning slot through the side wall of the aligner.

15. A feed mechanism including a receiver, means for delivering articles to the receiver, and an aligner into which the receiver projects, said aligner having a mouth to receive said articles, said mouth narrowing into a slot along which said articles pass.

16. A feed mechanism including a tubular aligner having a receiving mouth terminating in a slot, a receiver loosely mounted in the aligner, and means for delivering articles to the receiver.

17. A feed mechanism including a tubular aligner having a receiving mouth narrowing into a slot extending lengthwise along the aligner in its wall, a receiver loosely mounted in the aligner and extending lengthwise thereof, and means for delivering articles to the receiver.

18. A feed mechanism including a tubular magazine, and a receiver extending lengthwise within the magazine and having one end projecting out of the magazine to receive articles thereon, said receiver being loosely contained within the magazine.

19. A feed mechanism including a tubular magazine, an article receiving plate underlying the magazine, and a retainer resting loosely on said plate and projecting within the magazine to receive articles and position them on said plates, the end of the retainer being formed to allow disengagement of articles therefrom under the application of force.

20. A feed mechanism including a tubular magazine, an article receiving plate underlying the magazine, and a retainer and receiving rod resting loosely on said plate and projecting out at the opposite end of the magazine to receive articles thereon.

SAMUEL W. AVIS.